United States Patent [19]

Pohler

[11] Patent Number: 4,790,503
[45] Date of Patent: Dec. 13, 1988

[54] HOT LID HOLDER

[76] Inventor: Edna L. Pohler, 6152 W. Wabash Rd., Huntington, Ind. 46750

[21] Appl. No.: 174,873

[22] Filed: Mar. 29, 1988

[51] Int. Cl.⁴ .............................................. F16M 11/00
[52] U.S. Cl. ...................................... 248/176; 211/41; 248/37.3
[58] Field of Search ...................... 248/176, 37.3, 37.6, 248/231.8; 211/41; D6/468, 474

[56] References Cited

U.S. PATENT DOCUMENTS

| | | |
|---|---|---|
| D. 147,237 | 8/1947 | Herzog ............................... 211/41 X |
| D. 192,531 | 4/1962 | Guillaumant . |
| 265,635 | 10/1882 | Raughtigan et al. .............. 211/41 X |
| 424,863 | 4/1890 | Demorest .......................... 211/41 X |
| 1,349,084 | 8/1920 | Moore . |
| 1,390,157 | 9/1921 | Ohde . |
| 1,661,787 | 3/1928 | Chisholm ............................ 248/37.3 |
| 2,010,734 | 4/1935 | Parker ................................ 211/41 X |
| 2,574,099 | 11/1951 | Gessler ........................... 248/37.3 X |
| 2,901,197 | 8/1959 | Posey . |
| 3,028,972 | 4/1962 | Guillaumant . |
| 3,326,387 | 6/1967 | Princevalle . |
| 4,515,332 | 5/1985 | Scharfy . |
| 4,632,258 | 12/1986 | Borner . |

OTHER PUBLICATIONS

Plate Rack Stack adv., (Washington Post; Jan. 26, 1954).

Primary Examiner—Ramon O. Ramirez
Attorney, Agent, or Firm—David L. Ahlersmeyer

[57] ABSTRACT

A lid holder for the lid of a cooking utensil, such as a pot, pan, or dish, is disclosed wherein a base includes a plurality of support feet on the bottom surface thereof and a pair of U-shaped rods extending vertically from the top surface in parallel spaced relationship with one another. At least a portion of a lid is capable of being interposed between the U-shaped rods to maintain the lid in an upright position. A pair of cross bars extend between and are attached to the U-shaped rods, and contact the peripheral edge of the lid so as to space the lid from the top surface from the base. A drippings receptacle is provided in the elongated space between the U-shaped rods. In another embodiment, the U-shaped rods are located on one-half of the top surface, and a spoon holder comprising a recess is located on the other half. Cross bars may be provided across the spoon holder recess to space the receptacle portion of the spoon above the top surface.

20 Claims, 1 Drawing Sheet

U.S. Patent  Dec. 13, 1988  4,790,503
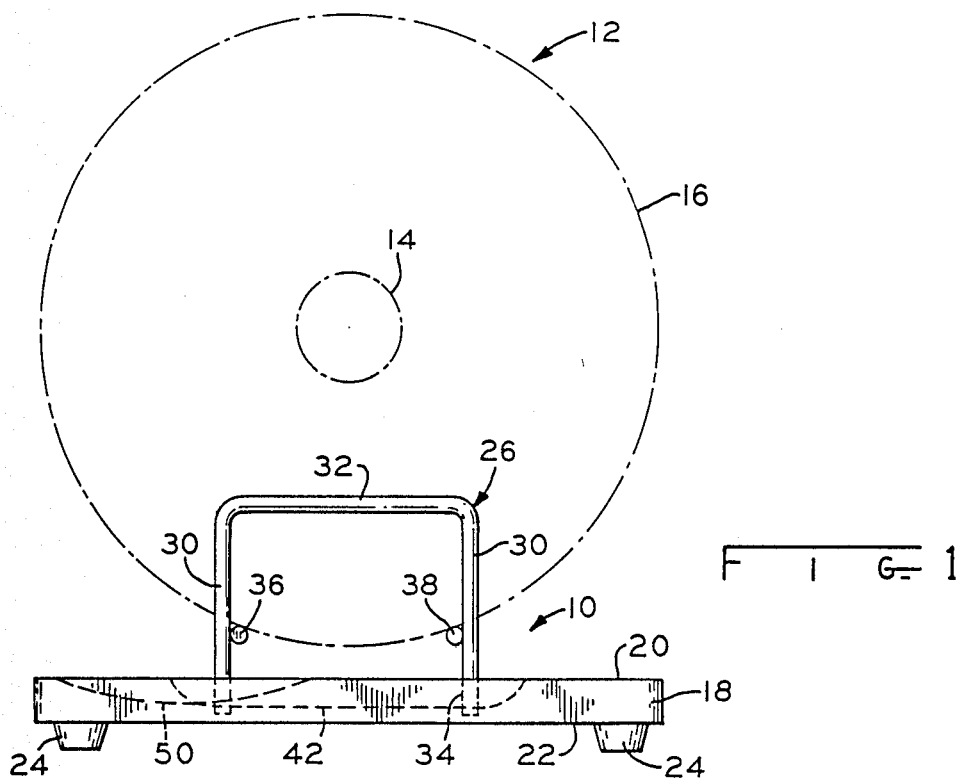
FIG 1
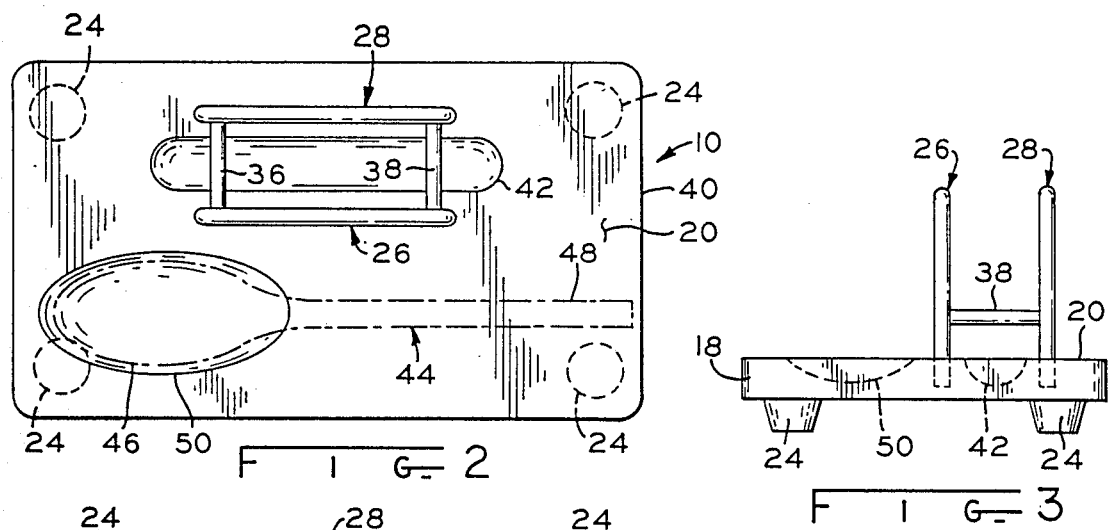
FIG 2
FIG 3
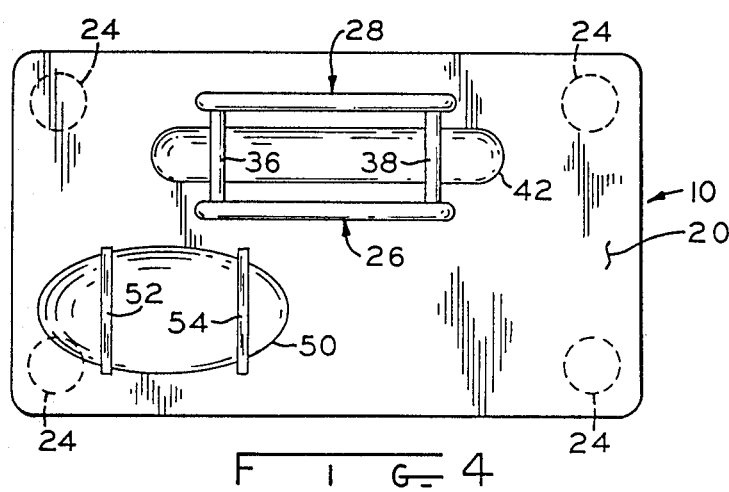
FIG 4

HOT LID HOLDER

BACKGROUND OF THE INVENTION

The present invention relates generally to novelty kitchen items and, more particularly, to an apparatus that holds the lid of a cooking utensil in a vertically upright position. More specifically, the lid holder of the present invention is intended for use on a stove top or counter top to hold a lid while cooking with its associated pot, pan, or dish.

It is a common practice when cooking with a vessel, such as a pot, pan, or casserole dish, to remove the lid of the vessel, either temporarily to stir and add ingredients to the contents of the vessel, or for extended periods of time to allow the contents to cook and release moisture in the form of steam. When the lid is removed, it is common practice to put the hot lid flat, i.e., in a horizontal position, on the top surface of the stove or an adjacent counter. The problems associated with this common practice are numerous. For instance, the periphery of the lid contacting the supporting top surface may be coated to some extent with the contents of the vessel, thereby soiling the stove or counter top when the lid is placed thereon. Likewise, any residual steam trapped beneath the lid will condense on the underside of the lid and on the stove or counter top. Aside from the problem of having to clean up the food and condensation deposited by a lid placed flat on a stove or counter top, certain surfaces or components of a stove top may be damaged by such deposits.

Several other problems associated with the placement of a hot lid on a flat stove or counter top surface include the possibility of the lid becoming stuck to the surface by a seal created by either dried food or condensation residing on the periphery of the lid. Forced detachment of the lid from the counter surface, if possible, may result in damage to other kitchen items or injury to the cook. Another problem posing a threat of injury to the cook is that of having a hot lid lying on a stove or counter top with the lid's entire top surface area openly exposed.

Prior art attempts to solve the aforementioned problems have included several devices that hold a lid in a generally vertical position. For instance, U.S. Pat. No. 1,349,084, issued to Moore, discloses a simple kettle cover drainer and holder having a base member and a pair of vertical bent wire supports extending to a height above the lid being held thereby. The lid rests on the base in a cup-shaped recess. Problems associated with the lid holder of Moore include difficulty in placing the lid in and removing the lid from the device while grasping the lid handle. Also, the lid periphery remains in contact with the drippings in the cup-shaped recess, thereby causing potential dripping from the lid when being removed from the holder. Furthermore, the wire supports may tend to separate apart over time as a result of thick lids being placed therebetween.

U.S. Pat. Nos. Des. 192,531 and 3,028,972, issued to Guillaumant, disclose a support rack including a unitary receptacle constructed of molded plastic or stamped steel. Another lid holder is disclosed in U.S. Pat. No. 3,326,387, issued to Princevalle, wherein provision is made for a pair of lids having various flange configurations on the peripheral edges thereof. The Guillaumant and Princevalle lid holders are more difficult to fabricate and, in operation, allow the peripheral edge of the lid to contact a vertical sidewall of the device, so as to allow excess food or condensation to possibly drip down the sidewall and onto the stove or counter top. Furthermore, with such a design, the width of the receptacle base is limited by the diameter of the lid.

While various lid holding devices have been known in the prior art, as demonstrated by the aforementioned patent references, none have experienced market success, as evidenced by the fact that few such devices, if any, are commercially available. Therefore, it is desired to provide a simple, effective lid holder that overcomes the disadvantages associated with the prior art lid holding devices.

SUMMARY OF THE INVENTION

The present invention overcomes the disadvantages of the above described prior art lid holders by providing an improved lid holder for the lid of a cooking utensil, wherein a lid is maintained in a vertically upright position by a pair of substantially parallel support members between which at least a portion of the lid is capable of being interposed.

In general, the invention provides a lid holder including a base and a pair of vertically support members attached to the top surface of the base and extending upwardly therefrom. More specifically, the invention provides, in one form thereof, a lid holder wherein a pair of horizontal cross members extend between and attach to the pair of vertically support members in a manner adapted to permit the peripheral edge of the lid to contact the pair of cross members without contacting the top surface of the base. The invention, in yet another form, provides that the peripheral edge of the lid contact the pair of cross members at a location above the top surface and inwardly from the outer periphery of the top surface.

An advantage of the lid holder of the present invention is that the lid is maintained spaced from fallen drippings, thereby preventing further dripping from the lid when removed from the lid holder.

Another advantage of the lid holder of the present invention is that the handle of the lid is easily accessible for placement into and removal from the lid holder.

A further advantage of the lid holder of the present invention is that drippings from the lid are less likely to drip onto the stove or counter top on which the lid holder is placed.

A still further advantage of the lid holder of the present invention is that the holder is less likely to tip over.

Another advantage of the lid holder of the present invention is the provision of a spoon holder incorporated therewith.

Yet another advantage of the lid holder of the present invention is that the vertical support members are less likely to separate from extended use.

The lid holding apparatus of the present invention, in one form, thereof, provides a base including a top surface having an outer periphery. The apparatus also includes a pair of substantially parallel vertical support members between which at least a portion of the lid is capable of being interposed. Each of the support members is attached to the base and extends vertically upwardly therefrom. In order to maintain the lid in spaced relationship above the top surface, a pair of spaced horizontal cross members are provided. Each cross member extends between and attaches to the pair of vertical support members in a manner adapted to permit the peripheral edge of the lid to contact the pair of cross members without contacting the top surface.

The invention further provides, in one form thereof, a lid holding apparatus particularly suited for holding a lid having a handle at the approximate center thereof, including a horizontal base having a top surface. The apparatus also includes a pair of substantially parallel U-shaped support members between which at least a portion of the lid is capable of being interposed. Each support member has a pair of vertical legs and a horizontal extension therebetween. The pair of legs are attached at a lower end thereof to the top surface and extend vertically upwardly therefrom. The horizontal extension extends between the upper ends of the vertical legs, and is at a height relative to the top surface below the handle of the lid. Accordingly, unobstructed access is provided to the handle when the lid is maintained in a vertically upright position within the holding apparatus.

The invention, in accordance with another embodiment thereof, provides a lid holding apparatus for a lid having a handle at the approximate center thereof. The apparatus includes a base having a top surface on which a lid side and a spoon side are established by an imaginary line approximately bisecting the top surface. A pair of spaced, substantially parallel vertical support members are provided for maintaining the lid in a vertically upright position. At least a portion of the lid is capable of being interposed between the support members. Each vertical support member is attached to the base on the lid side of the top surface and extends vertically upwardly therefrom. Furthermore, each vertical support member comprises a U-shaped member having a horizontal extension attached at opposite ends thereof to a pair of downwardly extending vertical legs. Each of the legs is attached at a lower end thereof to the top surface. The height of the horizontal extension relative to the top surface is below the handle of the lid. The lid holding apparatus further includes a pair of spaced, horizontal cross members, each of which extends between and attaches to respective vertical legs of the pair of vertical support members in a manner adapted to permit the peripheral edge of the lid to contact the pair of cross members without contacting the top surface.

BRIEF DESCRIPTION OF THE DRAWINGS

FIG. 1 is a front elevational view of a lid holder in accordance with one embodiment of the present invention, particularly showing a lid being maintained in a vertically upright position in spaced relationship with the top surface of the base;

FIG. 2 is a top view of the lid holder of FIG. 1, particularly showing the provision of a spoon holder on one-half of the base top surface;

FIG. 3 is a side elevational view of the lid holder of FIG. 1; and

FIG. 4 is a top view of the lid holder of FIG. 1, according to an alternative embodiment of the present invention.

DESCRIPTION OF THE PREFERRED EMBODIMENT

In an exemplary embodiment of the invention as shown in the drawings, and in particular by referring to FIGS. 1–3, a lid holder 10 is shown for holding a lid 12 in a vertically upright position. Lid 12, representing the lid of a typical cooking utensil such as a pot, pan, or casserole dish, includes a handle 14 centrally located on one side of the lid, and an outer peripheral edge 16.

In the preferred embodiment of the invention, as shown in FIGS. 1–3, lid holder 10 includes a generally flat, rectangular base 18 having a top surface 20 and a bottom surface 22. Base 18 is preferably molded from a plastic or synthetic marble material, but may also be made of wood or some other suitable material. A plurality of rubber support feet 24 are attached to bottom surface 22, as with screws, glue, or the like. Feet 24 frictionally engage a stove or counter top on which lid holder 10 is supported.

Lid holder 10 also includes a pair of spaced, parallel U-shaped rods 26, 28 that are attached to base 18 and extend vertically upwardly from top surface 20. Rods 26, 28 constitute vertical support members between which at least a portion of lid 12 is interposed, as illustrated in FIG. 1. In the preferred embodiment, rods 26, 28 are formed from 3/16 inch chrome plated steel wire and include a pair of vertical legs 30 and a horizontal extension 32 therebetween. For the purpose of mounting rods 26, 28 to base 18, the bottom portion of legs 30 are received within holes 34 in base 18 and are retained therein by epoxy, or the like. Other means for attaching rods 26, 28 to base 18 are contemplated, including providing a flange or knurl on the bottom portion of legs 30 and integrally molding rods 26, 28 within base 18 when the base is initially formed.

A pair of spaced, horizontal cross bars 36, 38 extend between and attach to respective opposing legs 30 of U-shaped rods 26, 28, as best illustrated in FIGS. 1 and 2. Where, as in the preferred embodiment, rods 26, 28 and bars 36, 38 comprise steel rods, bars 36, 38 may be attached to legs 30 by welding, soldering, brazing, or the like. As shown in FIG. 1, bars 36, 38 are attached to legs 30 at a height relative to top surface 20 such that peripheral edge 16 of lid 12 contacts and is supported by bars 36, 38 without contacting top surface 20. Accordingly, bars 36, 38 function as means for maintaining lid 12 in spaced relationship above top surfaces 20. Also, bars 36, 38 help maintain rods 26, 28 in spaced parallel relationship to one another.

In accordance with one aspect of the present invention, it is important that the location of contact between peripheral edge 16 and bars 36, 38 be inwardly from the outer periphery 40 of top surface 20. In this manner, drippings collecting on bars 36, 38 will tend to deposit on top surface 20, rather than drip onto the stove or counter top on which lid holder 10 is supported.

In accordance with a further aspect of the invention, it is important that the height of horizontal extension 32 relative to top surface 20 be less than that of handle 14 in order to provide unobstructed access to handle 14 when inserting or removing lid 12 from lid holder 10. More specifically, as shown in FIG. 1, the distance between the point of attachment of bars 36, 38 to legs 30 and horizontal extension 32 should be such that extension 32 is at a lower height relative to top surface 20 than is handle 20 when lid 12 is within lid holder 10.

As illustrated by a top view of lid holder 10 in FIG. 2, an elongated space is defined between rods 26, 28 on top surface 20, with cross bars 36, 38 extending transversely across the elongated space. Along the elongated space, top surface 20 includes a drippings receptacle comprising an elongated recess 42 extending beyond a projection of bars 36, 38 onto top surface 20, as shown in FIG. 2. Accordingly, drippings from lid 12 and cross bars 36, 38 fall primarily within recess 42.

Referring now to FIGS. 2 and 3, it can be seen that top surface 20 may be thought of as having two approximately equal rectangular areas on either side of an imaginary line bisecting top surface 20. The two sides may be designated as a lid side and a spoon side. In the case of the preferred embodiment, where rods 26, 28 are attached to top surface 20 on the lid side, the spoon side may serve several useful functions. In the case of lid 12 having a thickness less than the space between rods 26, 28, the lid may be slightly cocked so as to bear primary against legs 30 of rod 28 and against horizontal extension 32 of rod 26, while being supported by bars 36, 38. Despite the turning moment created by the lid being cocked as described, lid holder 10 is less likely to tip due to the extension of the base to resist such turning, namely, the provision of the spoon side.

Another use for the spoon side of top surface 20 is for the support of a conventional spoon 44 including a receptacle portion 46 and a handle portion 48. In such an arrangement, a cup-shaped recess 50 is provided in top surface 20 at one longitudinal end of the rectangular area of the spoon side. Accordingly, receptacle portion 46 of spoon 44 may rest within recess 50, while handle portion 48 may rest on top surface 20. In an alternative embodiment of the present invention shown in FIG. 4, a pair of spoon supports 52, 54 are attached to base 18 and extend transversely across recess 50. In the same manner that bars 36, 38 support lid 16 in spaced relationship above top surface 20, supports 52, 54 space receptacle portion 46 above recess 50. Supports 52, 54 may comprise straight wire rods contained within grooves cut in top surface 20. Alternatively, supports 52, 54 may comprise U-shaped rods similar to, and attached to base 18 in the same manner as, rods 36, 38.

It will be appreciated that the foregoing is presented by way of illustration only, and not by way of any limitation, and that various alternatives and modifications may be made to the illustrated embodiments without departing from the spirit and scope of the invention.

What is claimed is:

1. A lid holding apparatus for holding a lid, comprising:
    a base including a top surface having an outer periphery;
    vertical support means for maintaining said lid in a vertically upright position, said vertical support means comprising a pair of spaced, substantially parallel vertical support members between which at least a portion of said lid is capable of being interposed, each of said pair of vertical support members being attached to said base and extending vertically upwardly from said top surface; and
    horizontal support means for maintaining said lid in spaced relationship above said top surface, said horizontal support means comprising a pair of spaced, horizontal cross members, each of said pair of cross members extending between and attaching to said pair of vertical support members in a manner adapted to permit the peripheral edge of said lid to contact said pair of cross members without contacting said top surface.

2. The lid holding apparatus of claim 1 in which:
    said pair of cross members are attached to said pair of vertical support members in a manner adapted to permit the peripheral edge of said lid to contact said pair of cross members at a location above said top surface and inwardly from said outer periphery of said top surface.

3. The lid holding apparatus of claim 1, wherein said lid includes a handle in the center thereof, in which:
    said pair of vertical support members extend vertically upwardly from said top surface to a height below said handle, whereby unobstructed access is provided to said handle when said lid is maintained in a vertically upright position within said holder.

4. The lid holding apparatus of claim 3 in which:
    each of said pair of vertical support members comprises a U-shaped member having a horizontal extension attached at opposite ends thereof to a pair of downwardly extending vertical legs, each of said pair of legs being attached at a lower end thereof to said top surface, the height of said horizontal extension relative to said top surface being below said handle.

5. The lid holding apparatus of claim 1 in which:
    said pair of cross members are elongated rods extending between said pair of vertical support members in spaced relationship to said top surface.

6. The lid holding apparatus of claim 1 in which:
    said pair of vertical support members and said pair of cross members are composed of metal rod material.

7. The lid holding apparatus of claim 1 in which:
    said pair of vertical support members are attached to said base in a manner to provide an elongated space therebetween on said top surface, said pair of cross members extending transversely to said elongated space, said top surface including an elongated recess along said elongated space, said elongated recess extending beyond a projection of said pair of cross members onto said top surface.

8. A lid holding apparatus particularly suited for holding a lid having a handle at the approximated center thereof, comprising:
    a horizontal base including a top surface; and
    vertical support means for maintaining said lid in a vertically upright position, said vertical support means comprising a pair of substantially parallel U-shaped support members between which at least a portion of said lid is capable of being interposed, each support member comprising a pair of vertical legs and a horizontal extension therebetween, each of said pair of vertical legs being attached at a lower end thereof to said top surface and extending vertically upwardly therefrom, said horizontal extension extending between respective upper ends of said pair of vertical legs, said horizontal extension being at a height relative to said top surface below said handle, whereby unobstructed access is provided to said handle when said lid is maintained in a vertically upright position within said holder.

9. The lid holding apparatus of claim 8 in which:
    said top surface has a lid side and a spoon side on either side of an imaginary line approximately bisecting said top surface, and said vertical support means is located on said lid side.

10. The lid holding apparatus of claim 9 in which:
    said lid side and said spoon side comprise respective rectangular areas each having a pair of opposite longitudinal ends and a pair of opposite transverse sides, said top surface having a cup-shaped recess located on said spoon side at one of said pair of longitudinal ends thereof, whereby the receptacle portion of said spoon is received within said cup-shaped recess and the handle portion of said spoon is supported by said top surface.

11. The lid holding apparatus of claim 10, and further comprising:
  spoon supporting means for maintaining the receptacle portion of said spoon spaced above said cup-shaped recess.

12. The lid holding apparatus of claim 11 in which:
  said spoon supporting means comprises a pair of spaced, parallel cross bars mounted to said top surface and extending across said cup-shaped recess.

13. The lid holding apparatus of claim 8, and further comprising:
  horizontal support means for maintaining said lid in spaced relationship above said top surface, said horizontal support means comprising a pair of spaced, horizontal cross members, each of said pair of cross members extending between and attaching to said pair of vertical support members in a manner adapted to permit the peripheral edge of said lid to contact said pair of cross members without contacting said top surface.

14. The lid holding apparatus of claim 13 in which:
  said top surface has an outer periphery and said pair of cross members are attached to said pair of vertical support members in a manner adapted to permit the peripheral edge of said lid to contact said pair of cross members at a location above said top surface and inwardly from said outer periphery of said top surface.

15. The lid holding apparatus of claim 13 in which:
  said pair of vertical support members are attached to said base in a manner to provide an elongated space therebetween on said top surface, said pair of cross members extending transversely to said elongated space, said top surface including an elongated recess along said elongated space, said elongated recess extending beyond a projection of said pair of cross members onto said top surface.

16. A lid holding apparatus for a lid having a handle at the approximate center thereof, comprising:
  a base including a top surface having a lid side and a spoon side on either side of an imaginary line approximately bisecting said top surface;
  vertical support means for maintaining said lid in a vertically upright position, said vertical support means comprising a pair of spaced, substantially parallel vertical support members between which at least a portion of said lid is capable of being interposed, each of said pair of vertical support members being attached to said base on said lid side of said top surface and extending vertically upwardly therefrom, each of said pair of vertical support members comprising a U-shaped member having a horizontal extension attached at opposite ends thereof to a pair of downwardly extending vertical legs, each of said pair of legs being attached at a lower end thereof to said top surface, the height of said horizontal extension relative to said top surface being below said handle; and
  horizontal support means for maintaining said lid in spaced relationship above said top surface, said horizontal support means comprising a pair of spaced, horizontal cross members, each of said pair of cross members extending between and attaching to respective said vertical legs of said pair of vertical support members in a manner adapted to permit the peripheral edge of said lid to contact said pair of cross members without contacting said top surface.

17. The lid holding apparatus of claim 16, wherein both a lid and a spoon may be retained, in which:
  said lid side and said spoon side comprise respective rectangular areas each having a pair of opposite longitudinal ends and a pair of opposite transverse sides, said top surface having a cup-shaped recess located on said spoon side at one said longitudinal end thereof, whereby the receptacle portion of said spoon is received within said cup-shaped recess and the handle portion of said spoon is supported by said top surface.

18. The lid holding apparatus of claim 17, and further comprising:
  spoon supporting means for maintaining the receptacle portion of said spoon spaced above said cup-shaped recess.

19. The lid holding apparatus of claim 18 in which:
  said spoon supporting means comprises a pair of spaced, parallel cross bars mounted to said top surface and extending across said cup-shaped recess.

20. The lid holding apparatus of claim 16 in which:
  said pair of vertical support members are attached to said base in a manner to provide an elongated space therebetween on said top surface, said pair of cross members extending transversely to said elongated space, said top surface including an elongated recess along said elongated space, said elongated recess extending beyond a projection of said pair of cross members onto said top surface.

* * * * *